(12) United States Patent
Coulmeau et al.

(10) Patent No.: US 10,055,116 B2
(45) Date of Patent: Aug. 21, 2018

(54) TACTILE INTERFACE FOR THE FLIGHT MANAGEMENT SYSTEM OF AN AIRCRAFT

(71) Applicant: THALES, Courbevoie (FR)

(72) Inventors: François Coulmeau, Toulouse (FR); Frédéric Bonamy, Pessac (FR); Patrick Mazoyer, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/879,796

(22) Filed: Oct. 9, 2015

(65) Prior Publication Data

US 2016/0103579 A1 Apr. 14, 2016

(30) Foreign Application Priority Data

Oct. 10, 2014 (FR) ..................... 14 02278

(51) Int. Cl.
*G06F 3/00* (2006.01)
*G06F 3/0488* (2013.01)
*G06F 3/0484* (2013.01)
*G06T 19/00* (2011.01)
*G08G 5/00* (2006.01)
*G01C 21/00* (2006.01)
*G01C 23/00* (2006.01)

(52) U.S. Cl.
CPC ........... *G06F 3/0488* (2013.01); *G01C 21/00* (2013.01); *G01C 23/00* (2013.01); *G06F 3/0484* (2013.01); *G06F 3/04842* (2013.01); *G06T 19/006* (2013.01); *G08G 5/0021* (2013.01); *G08G 5/0039* (2013.01); *G08G 5/0047* (2013.01); *G08G 5/0052* (2013.01)

(58) Field of Classification Search
USPC ............ 701/3–18, 531–533; 244/75.1, 76 R, 244/195–197
See application file for complete search history.

(56) References Cited

U.S. PATENT DOCUMENTS 6,101,431 A * 8/2000 Niwa ..................... G01C 11/00
340/980
6,112,141 A * 8/2000 Briffe ..................... G01C 23/00
345/1.3
(Continued)

FOREIGN PATENT DOCUMENTS

EP 2 679 959 A2 1/2014
FR 2 910 678 A1 6/2008

*Primary Examiner* — Jonathan L Sample
(74) *Attorney, Agent, or Firm* — Baker & Hostetler LLP

(57) ABSTRACT

A graphic interaction method for piloting an aircraft, comprises receiving an indication of an object selected on a display screen of the aircraft; determining one or more flight plan revisions of the aircraft associated with the selected object and displaying one or more of said flight plan revisions; receiving an indication of selection of a displayed revision; determining a revision type associated with the revision displayed and selected; and as a function of the revision type determined, displaying a tactile interface data entry graphic symbol. Developments notably concern the symbology used, the validation or the modification of a selected revision, the taking account of the flight context, the taking account of the speed of manipulation of the tactile interface, etc. System and software aspects are described. In particular, the human-machine interface may be exclusively of tactile type.

16 Claims, 8 Drawing Sheets

(56) References Cited

U.S. PATENT DOCUMENTS

| | | | | |
|---|---|---|---|---|
| 6,484,072 B1* | 11/2002 | Anderson | G01C 5/005 | 244/75.1 |
| 7,106,217 B2* | 9/2006 | Judge | G01C 23/00 | 340/970 |
| 7,162,335 B2* | 1/2007 | He | G01C 23/005 | 340/947 |
| 7,383,106 B1* | 6/2008 | Coonse, Jr. | G10K 11/178 | 701/10 |
| 8,380,366 B1* | 2/2013 | Schulte | G01C 23/00 | 701/120 |
| 8,493,239 B2* | 7/2013 | Dehais | G08B 29/02 | 244/200 |
| 8,600,587 B1* | 12/2013 | Seah | G08G 5/045 | 701/10 |
| 8,694,184 B1* | 4/2014 | Boorman | G01C 23/00 | 340/945 |
| 9,032,319 B1* | 5/2015 | Hammack | G06F 3/0486 | 715/769 |
| 9,703,476 B1* | 7/2017 | Pappas | G06F 3/04847 | |
| 9,714,081 B1* | 7/2017 | Hall, III | B64C 19/00 | |
| 2003/0215143 A1* | 11/2003 | Zakrzewski | G06K 9/00771 | 382/190 |
| 2004/0061777 A1* | 4/2004 | Sadok | G08B 17/125 | 348/83 |
| 2004/0162648 A1* | 8/2004 | Bontrager | G01C 23/00 | 701/3 |
| 2005/0069207 A1* | 3/2005 | Zakrzewski | B64D 45/0015 | 382/190 |
| 2006/0142903 A1* | 6/2006 | Padan | G08G 5/045 | 701/3 |
| 2006/0142904 A1* | 6/2006 | Caillaud | G01C 23/00 | 701/3 |
| 2008/0262664 A1* | 10/2008 | Schnell | G01C 23/00 | 701/4 |
| 2009/0319100 A1* | 12/2009 | Kale | G08G 5/0013 | 701/4 |
| 2009/0326735 A1* | 12/2009 | Wood | G05D 1/0027 | 701/2 |
| 2010/0030400 A1* | 2/2010 | Komer | G10L 15/26 | 701/3 |
| 2010/0030406 A1* | 2/2010 | Christophe | B64D 11/0689 | 701/14 |
| 2010/0145553 A1* | 6/2010 | Vial | G01C 23/00 | 701/3 |
| 2010/0204855 A1* | 8/2010 | Vial | G01C 23/005 | 701/14 |
| 2011/0199338 A1* | 8/2011 | Kim | G06F 3/0418 | 345/175 |
| 2012/0075122 A1* | 3/2012 | Whitlow | A61B 5/18 | 340/963 |
| 2013/0124076 A1* | 5/2013 | Bruni | G08G 5/0095 | 701/120 |
| 2013/0132522 A1* | 5/2013 | Ruppin | B64D 45/0015 | 709/219 |
| 2013/0345905 A1* | 12/2013 | Parthasarathy | G01C 23/00 | 701/3 |
| 2014/0043241 A1* | 2/2014 | Sukumar | G06F 3/013 | 345/173 |
| 2014/0107871 A1* | 4/2014 | Williams | G01C 21/20 | 701/3 |
| 2014/0300555 A1* | 10/2014 | Rogers | G06F 3/0488 | 345/173 |
| 2015/0239574 A1* | 8/2015 | Ball | B64D 45/00 | 701/3 |
| 2015/0259075 A1* | 9/2015 | Case | G01C 5/005 | 701/4 |
| 2016/0011741 A1* | 1/2016 | Khatwa | G06F 3/04817 | 715/765 |
| 2016/0057032 A1* | 2/2016 | Tieftrunk | G01C 21/00 | 701/533 |
| 2016/0090097 A1* | 3/2016 | Grube | B60W 40/08 | 340/576 |

* cited by examiner

| Revision family (410) | Revision (420) | Character string (421) | Altitude (422) | Speed (423) | Time (424) | Distance/length (425) | Angle (426) | State/type (427) | Co-ordinates (428) | ... (429) |
|---|---|---|---|---|---|---|---|---|---|---|
| Constraints on a part of the flight path | Lateral zone go-around | Zone name | | | | Distance from zone | Departure and arrival angle | Direction (left, right) | | |
| Waiting or alignment turnaround procedure | Holding pattern HM | Point name | | Speed option | Inbound duration option: exit time | Inbound length distance | Inbound angle / Roll angle | Direction (left, right) | Option: number of circuits | |
| Environment weather | Insertion of surrounding winds | Option: point name | Wind altitude | | | Wind direction | | | Lat/long | |
| Administration of flight plans | Deletion of plan, substitution, modification | Flight plan 1, flight plan 2, point 1, point 2 | | | | | | Type of revision (partial copy, merge, etc.) | | |
| ... | ... | ... | ... | | | | | | | ... |

TACTILE INTERFACE FOR THE FLIGHT MANAGEMENT SYSTEM OF AN AIRCRAFT

CROSS-REFERENCE TO RELATED APPLICATION

This application claims priority to foreign French patent application No. FR 1402278, filed on Oct. 10, 2014, the disclosure of which is incorporated by reference in its entirety.

FIELD OF THE INVENTION

The invention is generally concerned with human-machine interaction techniques for piloting an aircraft. In particular, the invention concerns an interactive and tactile piloting interface of a real time onboard flight management system (FMS).

BACKGROUND

As a general rule, the interactive or tactile screens offered in known aircraft or aircraft on the market do not offer complete and satisfactory tactile interaction for managing revisions of the flight management system (FMS).

On aircraft of the A320, A330, A340, B737/747 generation, human-machine interaction is generally effected by means of a display screen that is not interactive and using an alphanumeric keypad on a multipurpose control display unit (MCDU) interface. This method is irksome and lacks precision. On more recent aircraft (A380, A350, B777, B787) and on business aircraft (Falcon, for example), pointing devices have been introduced but the associated interaction remains laborious and limited.

On a few even more recent aircraft or helicopters, interactive or tactile screens enable the pilot to define or modify the flight paths. The techniques employed remain limited and poorly ergonomic, however (where appropriate the modifications are indirect, for example). The pilot must "juggle" a plurality of entry means to effect a modification of the flight plan. For example, the pilot must enter angle values iteratively until there is convergence toward the required result. This manipulation is irksome.

In a few known tactile systems, the pilot can determine a point on the screen by tactile means, which operation opens a dialogue box making it possible to choose a revision, but the pilot must then insert alphanumeric parameters corresponding to the revision in question via a keypad, i.e. another entry peripheral. Other known systems necessitate the use of two separate screens.

In itself, the repetition of irksome operations can lead to cognitive overloading of the pilot, causing fatigue and therefore compromising flight safety. In some situations the lack of flexibility of existing systems can go as far as discouraging making changes to flight paths. In reality, in these known systems, tactile interaction is at present used only as a substitute for interaction via the cursor or the mouse. Rich tactile interaction specific to avionics has not yet been documented or implemented.

Patent application U.S. Pat. No. 7,162,335 entitled "GRAPHIC AIRWAYS DISPLAY FOR FLIGHT MANAGEMENT SYSTEM" discloses a system of graphic construction of the flight plan on the Navigation Display that aims to avoid entry of alphanumeric fields. In particular, the document teaches the use of a CCD or "on-screen marker" device to select elements from a navigation database. This approach has limitations.

There exists in the industry a requirement for methods and systems for advanced tactile interfaces specific to avionics.

SUMMARY OF THE INVENTION

The present invention concerns a graphic interaction method for piloting an aircraft, comprising the steps of receiving an indication of a selected object on a display screen of the aircraft; determining one or more flight plan revisions of the aircraft associated with the selected object and displaying one or more of said flight plan revisions; receiving an indication of a selection of a displayed revision; determining a revision type associated with the revision displayed and selected; and as a function of the revision type determined, displaying a tactile interface data entry graphic symbol. Developments notably concern the symbology used, the validation or the modification of a selected revision, the taking account of the flight context, the taking account of the speed of manipulation of the tactile interface, etc. System and software aspects are described. In particular, the human-machine interface may be exclusively of tactile type.

There is disclosed a graphic interaction method (implemented by computer) for piloting an aircraft, comprising the steps of receiving an indication of an object selected on a display screen of the aircraft; determining one or more flight plan revisions of the aircraft associated with the selected object and displaying one or more of said flight plan revisions; receiving an indication of selection of a displayed revision; determining a revision type associated with the revision displayed and selected; and, as a function of the revision type determined, displaying a tactile interface data entry graphic symbol, said data entry graphic symbol being selected in a symbology comprising a plurality of data entry graphic symbols.

An object or point or zone or portion of the display is determined or selected or indicated, for example by supplying spatial coordinates of this point (in space or on the display screen). For example, tactile, possibly multitouch, interface means can determine said display portion. In one embodiment, a single and unique display portion is indicated. In one embodiment, a plurality of display points is indicated.

On the basis of or as a function of this display portion or these display portions, one or more eligible revisions is or are determined. This determination may be effected in different ways. The determination step may be static, i.e. result from the application of predefined tables, for example associating selection area, associated actions, alphanumeric entry mode and, where appropriate, an alternative graphic entry mode.

Following the determination of one or more eligible revisions, the pilot selects one revision in particular.

There is then determined a revision type associated with this displayed and selected revision. As a function of the revision type determined, there is displayed a tactile interface data entry graphic symbol, said graphic symbol being selected in a symbology comprising a plurality of graphic symbols.

The term "symbology" refers generically to a family or class of symbols (which as modes of representation of data may comprise a very large number of specific variants). The term "symbology" is generally used hereinafter to connote and to emphasize the idea of class.

The determination of the symbology to be applied (i.e. the choice of one symbol in particular) may notably comprise steps of determining a plurality of "elementary" substitution models and then synthesizing said elementary substitution models as a function of predefined criteria. In one embodiment, a plurality of elementary substitution models is determined (for example as a function of the action of the pilot and/or the flight context, etc.). The various elementary substitution models are thereafter evaluated and/or weighted, as a function of predefined criteria, to be finally concatenated or aggregated or synthesized in a final substitution model (i.e. a model that will be displayed for the attention of the pilot). In other words, the various elementary substitution models correspond to intermediate levels of abstraction that remain entirely optional (the corresponding operations are calculation operations that are transparent for the pilot, who perceives only the final interaction mode).

For example, the symbology (i.e. the interaction model that has been determined) to be applied to/on a revision could be one of the following models: a) the application of a "mono-data" model, e.g. the unitary model corresponding to the manipulated parameter for the alphanumeric mono-entry families, or b) the application of a "multi-data" model, e.g. a superposition of the unitary models for the multi-alphanumeric entry families, or c) the application of a "pure graphic model", e.g. a lat/long model for the families without alphanumeric entry linked to a points on a lateral representation.

In some embodiments a choice of interaction mode may not be offered, i.e. a unique interactive graphic symbol is displayed. Where appropriate, a choice may optionally be effected between different interaction modes that may be envisaged in order to proceed to the revision associated with the object that has been determined. This choice may in particular be reflected in the display of different interactive graphic symbols. Different interactive graphic symbologies are described hereinafter.

In one embodiment, each interaction model may be associated with one or more actions and each action may be associated with an alphanumeric entry mode, where appropriate with its correspondence in terms of graphic entry.

In a development, the method further comprises a step of receiving data following the manipulation of the data entry graphic symbol.

The data consists of alphanumeric values, for example. In one embodiment, the method captures the actions on the model and deduces therefrom modified alphanumeric parameters.

In a development, the method further comprises a step of modifying the received data.

The method may in particular proceed to measurement unit conversions.

In a development, the method further comprises a step of validating the selected revision.

The method may activate or validate the so-called "core" revision, for example with the selected values or alphanumeric parameters, possibly modified. The method may then verify the pertinence of the elementary models following the revision. In one embodiment, the steps are repeated, for example until the revision is confirmed.

In a development, the method further comprises a step of modifying the selected revision.

Moreover, the method may correct the revision concerned in some cases.

In a development, the method further comprises a step of modifying the display of the data entry graphic symbol as a function of parameters comprising a measurement of the cognitive load of the pilot and/or the flight context of the aircraft.

In accordance with one aspect of the invention, in correspondence with each action of the pilot interacting with the FMS (e.g. an action may be a "revision", for example of the flight plan), entry via the keypad is replaced with graphic selections rendering the same service—in whole or in part—and in particular may be contextualized and/or optimized to correspond to the most probable intention of the pilot.

The symbols used are particularly suited to unitary revisions, but also to multiple revisions (e.g. via the superposition of the symbols). Moreover, the symbols used may be modified in real time, notably in order to adapt to the current revision type. The semiology or "symbology" may advantageously change (i.e. be modified or adapted), for example in real time to adapt to the current revision type or piloting action.

In a development, the step of displaying the data entry graphic symbol comprises a step of distributing said display spatially and/or temporally.

The display of one or more symbols may be optimized (i.e. adapted, for example to the current revision and/or to the flight context). To be specific, the selected interaction model (reflected by the display of corresponding graphic symbols) may be distributed across the various screens in an optimized manner (e.g. spatial distribution or arrangement of the information on the various screens available and/or accessible). For example, in terms of space, the display may be split or divided or distributed between a plurality of display devices where necessary. For example, the method may optionally offset or move the whole of the display graphically, for example during entry, to enable the substitution model to be displayed at the limits of this display area. The display of the value may for example be effected at different places within the visual field of the pilot, for example near the revision means (finger, cursor) or elsewhere in the cockpit (head-up projection, augmented reality type superimposition, 3D rendition, etc.). In terms of time, the graphic symbol may comprise display sequences ordered in various ways.

In a development, the method further comprises a step of receiving or determining a parameter associated with the indication of the selected object on the display screen of the aircraft.

In a development, the step of determining one or more revisions of the flight plan of the aircraft associated with the selected object is a function of said parameter associated with the indication of the selected object.

In a development, the step of determining and/or displaying a tactile interface data entry graphic symbol is a function of said parameter associated with the indication of the selected object.

For example, the associated parameter may correspond to the measured speed of movement of the finger of the pilot over the tactile interface (in this case the parameter is determined or measured). A numerical value may equally well be received (directly or indirectly), for example by voice or tactile or logic or network command or by a physical thumbwheel or a mouse cursor or by eye movement (e.g. eye tracking).

The numerical value determined in this way (by calculation or as received) may be interpreted (for example) as an intensity influencing the degree or the modalities of interaction for the entry (alphanumeric and/or graphic), for example impacting on the determination of the eligible revisions and/or the types of those revisions and/or the choice of the data entry symbol or symbols. For example, during turbulence causing the hand of the pilot to tremble, such or such an interaction mode could be given preference.

Concerning the aspects specific to the management of the tactile interface, the algorithms for managing the movement of the finger (or of the cursor or pointing device) may notably be a function of various parameters. The algorithms may notably be a function of the speed of movement of the latter over the tactile interface (for example a speed determined as being high may reflect the fact that the pilot is in an hurry and/or an emergency situation and/or a lower or lessened necessity to render precise results). The algorithms may also be a function of other objects, for example those close to the selection. The algorithms may also be a function of the displayed or current flight path. They may further be a function of the roundings and/or units corresponding to the current revision (for example per entire FL—or 100 ft—in the case of the altitude). They may be a function of the display range, of the type of representation (2D ND, 2D VD, 3D, 2.5D), etc.

In a development, the step of determining and/or displaying a tactile interface data entry graphic symbol is a function of one or more parameters comprising a) the amount of data to enter, b) the type of revision to be made, c) the entry unit type, d) the display range, e) the representation type and/or f) one or more predefined criteria.

A system is disclosed comprising means for implementing one or more steps of the method in accordance with the invention.

Generally speaking, the system or device may include a processor or calculation means, a memory or storage means and human-machine interface (HMI) means. In particular, the invention makes possible embodiments entirely—and exclusively—including tactile interfaces. In fact, alphanumeric entry modes may advantageously be entirely replaced by graphic entry modes ("Full Graphical FMS").

In a development, the system comprises a principal flight display PFD and/or a navigation display ND/VD and/or a multifunction display MFD.

In a development, the system comprises flight management avionic means of Flight Management System type and/or non-avionic means of Electronic Flight Bag type and/or augmented and/or virtual reality means.

The AR means comprise in particular HUD (Head Up Display) type systems and the VR means comprise in particular EVS (Enhanced Vision System) or SVS (Synthetic Vision System) type systems.

In a development, the system comprises exclusively tactile type interface means. In one particular embodiment of the invention, the cockpit is entirely tactile, i.e. exclusively constituted of tactile type human-machine interfaces (HMI).

The methods and systems in accordance with the invention in fact enable "all tactile" embodiments (for example an FMS interface in the cockpit will be of "all tactile" type), that is to say conforming to a human-machine interaction environment consisting entirely of tactile screens, with no tangible actuator, but advantageously reconfigurable in its entirety. It is in fact possible to manage all (i.e. the entirety without exception) of the multi-parameter revisions in a tactile manner (because of the approach enabling interactive graphic symbols to be superposed). It is therefore possible to eliminate keypad entry completely. Failing an "all tactile" implementation, the methods and systems in accordance with the invention enable a drastic and advantageous reduction in alphanumeric entry via the keypad.

Generally speaking, one aspect of the invention aims to define an "FMS substitution language" that makes it possible to manipulate all possible FMS revisions in accordance with one or more suitable models (by means of graphic symbols corresponding to the craft aspects). This language is notably reflected in the existence of predefined parameters and rules enabling management of human-machine interaction (e.g. steps of substituting for a non-tactile elementary task an equivalent tactile task).

The invention notably aims to be able to control the flight management system (FMS) "by finger", that is to say using a tactile screen, either exclusively or in combination with non-tactile interfaces.

In accordance with one aspect of the invention it is possible to dispense with alphanumeric entry via keypad or at least to reduce recourse to non-tactile interfaces. In accordance with one aspect of the invention, alphanumeric entry is replaced by functions of direct selection on the object to be modified, not involving such keypad entry or at least substituting for some keypad entry the tactile counterpart.

In accordance with one embodiment, the invention advantageously makes it possible to dispense with an alphanumeric keypad and/or the necessity of recourse to an additional entry peripheral. In accordance with one embodiment, the invention advantageously makes it possible to interact in a completely graphic manner, or at least drastically limiting any recourse to alphanumeric entry. In one embodiment, the selection means may adapt continually or permanently in order to enable precise selection of the value to be entered. Fluid entry can therefore be assured for the crew, who can generally see the result of their actions instantaneously, as and when the tactile interface is manipulated, for example without ever having to effect head-down alphanumeric entry.

In accordance with various embodiments, the method enables modes of capture or entry of alphanumeric values, notably using only one or more tactile interfaces. This data entry is advantageously fast and intuitive. Certain embodiments may nevertheless use "hybrid" interfaces, i.e. combine tactile and non-tactile interfaces (keypad, cursor, mouse, trackball, trackpad, haptic system, voice control, eye-tracking control, etc.).

In accordance with embodiments of the invention, tactile interface human-machine interaction models specific to avionics (that is to say suited to piloting environments) may advantageously be used. In other words, the developments of the invention go beyond simple transposition of the tactile technology to avionic environments, but to the contrary recast the interaction of the pilot with the flight management system. The ergonomics of the human-machine interaction in the FMS may in fact be rethought in depth (e.g. to optimize the entry of information directly on the screen). For example embodiments of the invention make it possible to develop new transfer functions (for example "Drawing/Alphanumeric", optimized to handle the peculiarities of an onboard craft core system FMS). The (partial or total) transformation of tangible elements—which are by definition therefore rigid or invariant—into graphic/logic equivalents makes possible greater flexibility in implementation (beyond merely reconfiguring the cockpit, i.e. taking account of the context for the display and the manipulation of data, customization of the data and/or action means, the interfaces becoming programmable and/or configurable).

The method in accordance with the invention is advantageously generally backwards compatible. A number of developments of the method in accordance with the invention notably define entry modes using "graphic boxes" represented on the screen that display the final numerical or symbolic values, as modified by the pilot and/or the flight management system. A number of types of graphic box exist, notably "distance", "angle", "altitude", "speed", "mass", "centring", etc. Clicking in a box (with the finger or the cursor) optionally makes it possible to enter the required values via a keypad. This enables compatibility to be preserved with interactions as at present implemented in commercial aircraft. The functions requiring an alphanumeric calculation still propose to materialize a window on the screen in which the crew enters data using an alphanumeric keypad. Although the technical solution proposed by the invention can be implemented or used on tactile type interfaces, it can therefore also be implemented or used with current cursor interaction systems.

The method makes possible the definition and the use of new functions in the flight management system. For example, new functions may be associated with a revision, notably by making it possible to select an alphanumeric value without it being necessary to enter it via a keypad, but by directly manipulating new symbols associated with said revision. Some embodiments of the method in accordance with the invention make it possible to integrate new functions in flight management systems FMS (calculations of angles, distance, altitude differences, map rotations; revision on an element other than the FMS, for example an aircraft displayed on the screen by the TCAS function, a terrain or a meteorological anomaly displayed on the screen). The method in accordance with the invention also makes possible advanced bypass functions (entry of the bypass skeleton by simple tactile commands, capture or entry of the value of the offset enabling avoidance of the anomaly by manipulating, e.g. "pulling", the flight path obtained, etc.). Finally, the method also makes it possible to consider one or more actions on parameters such as the speed, by acting on the aircraft model, or on a flight path element (e.g. action on the RTA by clock, chronometer or hourglass type pattern, etc.). Finally, the method may be used in a Vertical Display type context (i.e. during Navigation Display ND in the vertical plane). For example, in one embodiment it is possible to modify in real time the vertical flight path (movement of pseudowaypoints, movement of altitude or speed or time constraints, etc.). It is also conceivable to create a library of tactile and/or gestural commands, notably for "turning" the map, enabling the pilot to apply map rotations to perceive their environment in the lateral or vertical (or three-quarter) plane. The method in accordance with the invention finally makes possible new interactions (for example a DIRECT TO function with an alignment on the next leg).

The method in accordance with the invention will advantageously be implemented in a great variety of avionic systems and environments. The method may be implemented onboard, between an interactive (tactile or non-tactile) interface on the one hand and an FMS (or an EFB, a tablet, etc.) or an FWS (in particular for ticking or selecting boxes or options, for example), or on the ground (for example in an air traffic control human-machine interface (HMI) or airline software). The invention also finds an advantageous application to the entry of aeronautical routes, for example of TAXI (airport taxying system) type. Finally, the invention finds an advantageous application in a drone remote piloting cabin.

BRIEF DESCRIPTION OF THE DRAWINGS

Various aspects and advantages of the invention will become apparent on the basis of the following description of a preferred but nonlimiting embodiment of the invention with reference to the figures:

FIG. 4 shows examples of revisions and craft parameters.

DETAILED DESCRIPTION

Certain terms and technical environments are defined hereinafter.

The abbreviation FMS refers to aircraft flight management systems known in the prior art via the ARINC 702 international standard. During the preparation of a flight or in the event of rerouting, the crew enters various items of information relating to the progress of the flight, typically using an aircraft flight management system (FMS). An FMS comprises entry means and display means, together with calculation means. An operator, for example the pilot or the co-pilot, is able to enter via the entry means information such as RTA or waypoints, associated with routing points, i.e. points over which the aircraft must pass. These elements are known in the prior art via the ARINC 424 international standard. The calculation means notably make it possible to calculate the flight path of the aircraft from the flight plan comprising the list of waypoints as a function of the geometry between the waypoints and/or altitude and speed conditions.

In the remainder of the document, the abbreviation FMD is used to designate the text display of the FMS present in the cockpit, generally in a head-down position (at the level of the knees of the pilot). The FMD is organized into "pages" that consist of functional groupings of coherent information. These pages include the FPLN page that lists the elements of the flight plan (waypoints, markers, pseudo waypoints) and the "DUPLICATE" page that shows the results of searches in the navigation database.

The abbreviation ND is used to designate the graphic display of the FMS present in the cockpit, generally disposed at face level. This display is defined by a reference point (centred in or at the bottom of the display) and a range, defining the size of the display area.

The abbreviation HMI refers to the human-machine interface. The entry of information and the display by the display means of information entered or calculated constitutes one such human-machine interface. With devices of known FMS type, when the operator enters a waypoint, they do so via a dedicated display that is displayed by the display means. This display can also show information relating to the temporal situation of the aircraft relative to the waypoint concerned. The operator can then enter and view a time constraint set for this waypoint. Generally speaking, the HMI means enable the entry and consultation of flight plan information.

Figure 1:
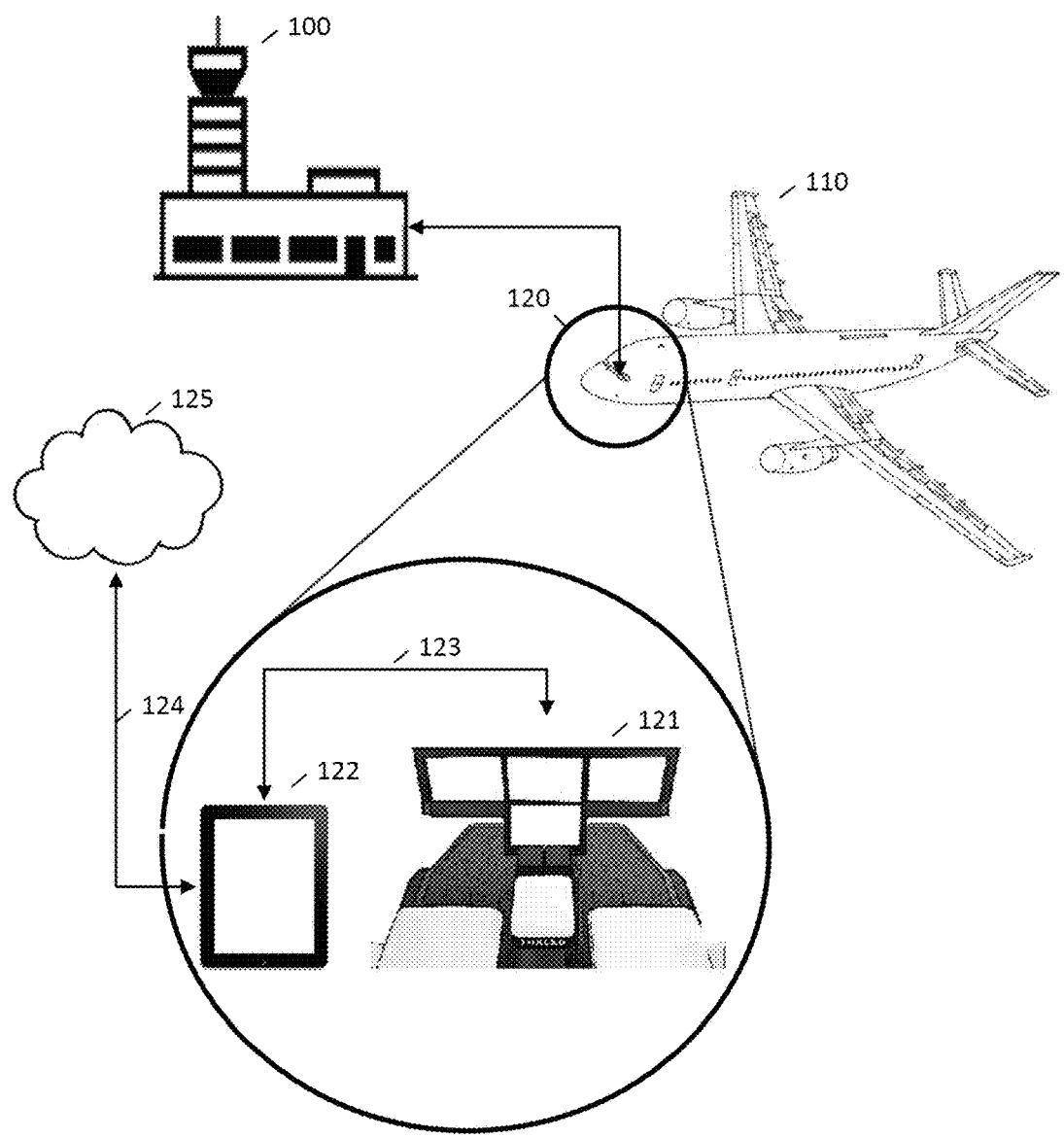
FIG. 1 shows the overall technical environment of the invention.

FIG. 1 shows the global technical environment of the invention. Avionic equipment or airport means 100 (for example a control tower communicating with air traffic control systems) are in communication with an aircraft 110. An aircraft is a means of transport capable of moving around in the terrestrial atmosphere. For example, an aircraft may be a fixed wing aircraft or a helicopter (or a drone). The aircraft includes a pilot cabin or cockpit 120. In the cockpit is located piloting equipment 121 (referred to as avionic equipment) including for example one or more onboard computers (calculation, memory and data storage means), including an FMS, data display or visualization and entry means, communication means, and (where applicable) haptic feedback means and a taxiing computer. A touch-screen tablet or an EFB 122 may be provided on board, either as a portable device or integrated into the cockpit. Said EFB can interact (by way of bilateral communication 123) with the avionic equipment 121. The EFB can also be in communication 124 with external data processing resources accessible via the network (for example cloud computing resources 125). In particular, calculations may be effected locally in the EFB or partly or totally in the calculation means accessible via the network. The onboard equipment 121 is generally certified and regulated whereas the EFB 122 and the connected data processing means 125 are generally not (or less so). This architecture makes it possible to inject flexibility into the EFB 122 with controlled safety on the side of the onboard avionics 121.

The onboard equipment includes various screens. The ND screens (graphic display associated with the FMS) are generally disposed in the primary field of view, at face level, whereas the FMD are positioned "head-down". All of the information entered or calculated by the FMS is grouped on so-called FMD pages. Existing systems enable navigation from page to page, but the size of the screens and the necessity not to put too much information on a page for reasons of readability do not enable a complete overview of the current and future situation of the flight in a synthetic manner. Modern aircraft crews generally consist of two persons, one on each side of the cabin: a "pilot" side and a "co-pilot" side. Business aircraft sometimes have only a pilot, and some older or military transport aircraft have a crew of three persons. Each views the pages of interest to them on their HMI. Two pages from the approximately one hundred possible pages are generally displayed permanently during the execution of the sortie: the "flight plan" page first of all, which contains information on the route followed by the aircraft (list of next waypoints with their associated predictions in terms of distance, time, altitude, speed, fuel, wind). The route is divided into procedures, themselves consisting of points (as described in the patent FR2910678), and then the "performance" page, which contains the parameters useful for guiding the aircraft in the short term (speed, altitude ceilings, next changes of altitude). There also exists a multitude of other pages available on board (lateral and vertical revision pages, information pages, pages specific to certain aircraft), generally approximately one hundred pages.

Figure 2:
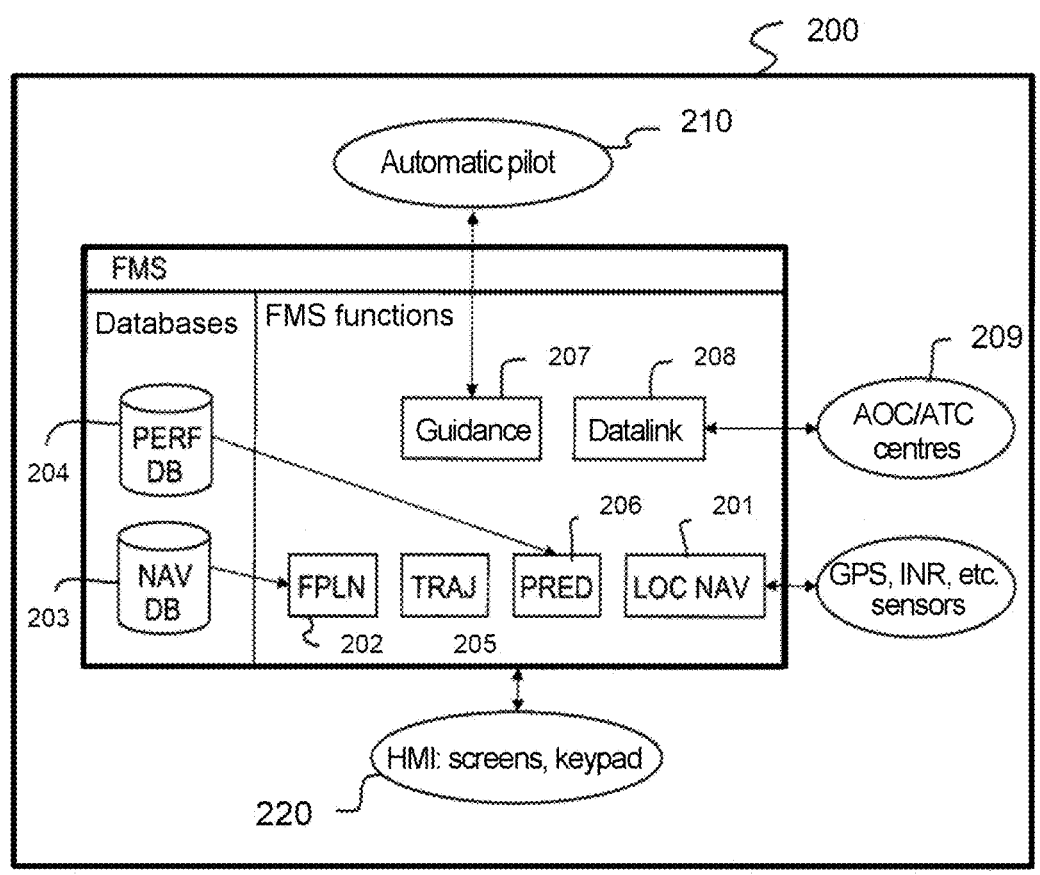
FIG. 2 shows diagrammatically the structure and the functions of a known FMS type flight management system.

FIG. 2 shows diagrammatically the structure and the functions of a known FMS type flight management system. An FMS type system 200 disposed in the cockpit 120 and the avionic means 121 have a human-machine interface 220 comprising entry means, for example a keypad, and display means, for example a display screen, or simply a touch-sensitive display screen, and at least the following functions:

Navigation (LOC NAV) 201, for locating the aircraft optimally as a function of geolocation means such as satellite geo-positioning or GPS, GALILEO, VHF radio navigation beacons, inertia centres. This module communicates with the aforementioned geolocation devices.

Flight plan (FPLN) 202, for entry of the geographical elements constituting the "skeleton" of the route to be followed, such as points imposed by departure and arrival procedures, waypoints, airways. An FMS generally contains a plurality of flight plans (the so-called "Active" flight plan along which the aircraft is guided, the "temporary" flight plan enabling modifications to be effected without activating guidance on this flight plan, and working "inactive" flight plans (referred to as "secondary").

Navigation database (NAV DB) 203, for constructing geographical routes and procedures on the basis of data included in the databases relating to the points, beacons, interception legs or altitude, etc.

Performance database (PERF DB) 204, containing the aerodynamic and engine parameters of the aircraft.

Lateral flight path (TRAJ) 205, for constructing a continuous flight path from the points of the flight plan, conforming to the performance of the aircraft and the confinement constraints (RNAV for area navigation or RNP for required navigation performance).

Predictions (PRED) 206, for constructing an optimized vertical profile of the lateral and vertical flight path and giving estimates of distance, time, altitude, speed, fuel and wind, notably over each point, at each change of piloting parameter and destination, to be displayed to the crew. The methods and the systems described affect or concern this part of the computer.

Guidance (GUID) 207, for guiding the aircraft in the lateral and vertical planes on its three-dimensional flight path, whilst optimizing its speed, using information calculated by the Predictions function 206. In an aircraft equipped with an autopilot 210, the latter can exchange information with the guidance model 207.

Digital data link (DATALINK) 208 for exchanging flight information between the Flight plan/Predictions function and the control centres or other aircraft 209.

One or more HMI screens 220. All of the information entered or calculated by the FMS is grouped on display screens (FMD, NTD and PFD pages, HUD, etc.). On A320 or A380 type airliners, the flight path from the FMS is displayed at face level, on a Navigation Display (ND) screen. The navigation display offers a geographical view of the situation of the aircraft, displaying a background map (the exact nature, the appearance, the contents of which may vary), sometimes with the flight plan of the aircraft, the characteristic points of the sortie (equal-time points, end of climb, start of descent, etc.), the surrounding traffic, the weather in its various aspects such as winds, storms, areas with icing conditions, etc. In aircraft of the A320, A330, A340, B737/747 generation, there is no interaction with the flight plan display screen. The flight plan is constructed using an alphanumeric keypad of an MCDU (Multi Purpose Control Display Unit) interface. The flight plan is constructed by entering the list of waypoints represented in tabular form. A certain amount of information on these waypoints can be entered via the keypad, such as the constraints (speed, altitude) that the aircraft must comply with on passing the waypoints. This solution has a number of drawbacks. It does not enable direct deformation of the flight path, necessitating entry of successive waypoints, either ones existing in the navigation database (onboard NAV DB with the standardized AEEC ARINC 424 format), or created by the crew via their MCDU (for example by entering coordinates). This method is irksome and inaccurate given the size and resolution of current display screens. For each modification, for example a deformation of the flight path to avoid a moving hazardous weather anomaly, it may be necessary to enter again a succession of waypoints outside the area in question.

Based on the flight plan (list of waypoints) defined by the pilot, the lateral flight path is calculated as a function of the geometry between the waypoints (routinely referred to as a LEG) and/or the altitude and speed conditions (that are used to calculate the turn radius). On this lateral flight path, the FMS optimizes a vertical flight path (in terms of altitude and speed), via any altitude, speed, time constraints. All of the information entered or calculated by the FMS is grouped on display screens (MFD pages, NTD and PFD, HUD etc. displays). The HMI portion of FIG. 2 therefore includes a) the HMI component of the FMS that structures the data to send to the display screens (CDS—Cockpit Display System) and b) the CDS itself, representing the screen and its graphic driver software, which effects the display of the drawing of the flight path and also includes the drivers enabling identification of the movements of the finger (in the case of a tactile interface) or the pointing device.

Figure 3:
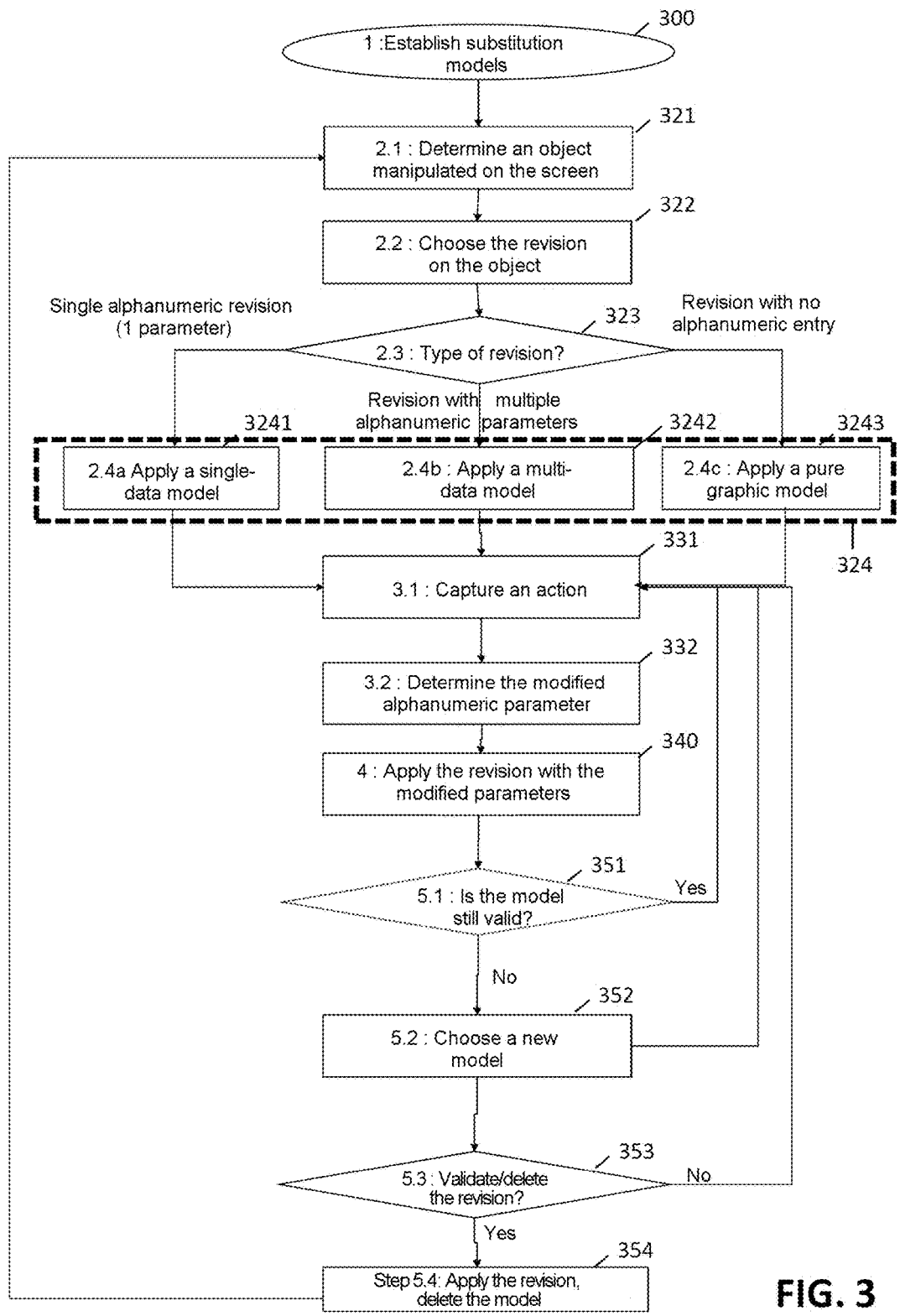
FIG. 3 shows examples of steps of a method in accordance with the invention.

FIG. 3 shows examples of steps of the method in accordance with the invention.

There is generally a preliminary step of establishing substitution entry models 300, which can replace (totally or in part) alphanumeric entry operations via the keypad or by means of a tangible device with entry operations using a tactile device. In a first step 300, possibly carried out beforehand, the method in accordance with the invention can therefore proceed to establish one or more substitution models 300. The substitution models correspond to "crafts" of the flight management system FMS. These models may be optimized by revision type (e.g. by act or action or command or instruction or order type). The step 300 may notably comprise a step of constructing a database (or "craft knowledge" base) comprising graphic (interaction) models addressing, for example for each known FMS revision, all of the alphanumeric actions possible on that revision. Using the specifics of these FMS revisions defined in this way, it is possible to create a graphic domain-specific language (DSL). In these preliminary steps, the parameters in play in the FMS revisions are characterized. The method may for example determine a set of models (or patterns) to substitute for the alphanumeric selection to be applied for a given revision. Said models may for example be a function of a) the amount of data to capture or enter, b) the type of the FMS revision to be done, c) the units of the parameters, d) the display range, e) the representation type or f) other, generally predefined, criteria. The links or associations between these models and the possible or resultant alphanumeric values may be configurable.

In the step 321, an object manipulated on the screen (or a display portion of the screen) is determined. This portion may be square or rectangular or of other any other geometrical shape. The display portion may equally be of irregular, i.e. non-geometrical shape. In particular, the display portion may be received from an external analysis model. There are several possible options with respect to designation or selection or indication of an object (or of a display area) on the screen.

In the step 322, associated with the object that has been determined, a revision is selected. A choice is therefore made by the pilot as to the revision required on the object that has been determined. For example, on an object, a menu (drop-down or otherwise) enables the pilot to select the revision that is to be made on the object, from the list of revisions offered for the step concerned. Filtering can make it possible to display only eligible revisions for the object. For example, if the object selected is the "arrival runway", revisions could be proposed such as DIRECT or HOLD, but not necessarily the entry of a "altitude constraint" or "speed". According to one option, there is systematic resource to the "Revision" menu of the FMS. According to another option, the various possible interactions will be displayed directly. According to a further option, a combination of direct and indirect interactions will be generated and proposed to the pilot. In accordance with the second option, the method in accordance with the invention further proposes in addition to the revision menu all the interaction choices directly possible on the object as a function of its nature.

In the step 323, the type of the selected revision is determined. The various revisions can in fact be classified by type. A restricted number of families makes it possible to define and to provide a foundation for the interaction model substitution. The advantages associated with a restricted model are notably limiting the learning curve and familiarization, enhanced intuitive interface and integration of new and future functions in this model. In one embodiment, the method classifies the revisions into subfamilies (of which FIG. 4 shows a few examples).

In the step 324, on the basis of the revision type that has been determined, a substitution interaction model is determined and then optimized and/or applied. In the step 324, when a revision is selected on the screen (or on another screen) since the type of said revision has been determined, the method in accordance with the invention then determines the most appropriate HMI interaction model (i.e. best suited to the current revision) and positions the selected model on the various screens in an optimized manner (e.g. spatial distribution or arrangement of the information over the various available and/or accessible screens).

This optimization may notably take into account the current "range" (i.e. the numerical limits) and/or the type of representation (for example, the modification of lateral data on a vertical representation will be modelled differently from a modification of the same lateral data on a lateral representation). The interaction model may be used in accordance with different time frames. In one embodiment, the model is applied after the selection of the object (e.g. the indication of a display area), e.g. as a function of its peculiarities (interaction constraints or requirements, as defined beforehand, for example). In one embodiment, the model is applied or used at the time of or after the selection of a revision associated with the object or the display area. The management of the possible overloading of the display by superposed symbols may be managed or optimized by a controller module, for example an external controller module (display watchdog). This display overload situation may occur in particular if the selected object is significantly modified (in terms of the frequency and/or number of modifications).

The substitution model as determined is applied to the revision as determined previously. For example, the model to be applied to a revision will be: a) the application of a mono-data model, e.g. the unitary model corresponding to the manipulated parameter for the alphanumeric mono-entry families (step 2.4*a* or 3241), or b) the application of a multi-data model, e.g. a superposition of the unitary models for the multi-alphanumeric entry families (step 2.4 or 3242) or c) the application of a pure graphic model, e.g. a lat/long model for the families without alphanumeric entry linked to points on a lateral representation (step 2.4*c* or 3243).

In concrete terms, in the step 324, the method displays one or more graphic symbols chosen from predefined symbologies, corresponding to the type of revision that has been determined on the basis of the selected revision.

The term "symbology" refers generically to a family or class of symbols (which as modes of representation of data may comprise a very large number of specific variants). The term "symbology" is generally used hereinafter to connote and to emphasize the idea of class.

In some embodiments no choice of interaction mode may be offered, i.e. a single interactive graphic symbol is displayed. Where appropriate, a choice may optionally be made between different interaction modes that can be envisaged in order to proceed to the revision associated with the object that has been determined. This choice may in particular be reflected in the display of different interactive graphic symbols. Different interactive graphic symbologies are described hereinafter.

In the step 331, after the display of a graphical symbology (e.g. a specific symbol), an action of the pilot interacting with the latter is "captured". In the step 331, the method captures (i.e. receives an indication of) an action on the revision model: this action is linked or connected to or associated with the entry of an alphanumeric value. In other words, and in particular, the step 331 captures the position of the finger relative to the model with which it is interacting and deduces therefrom the associated alphanumeric variable or variables.

This value is subsequently displayed, possibly in an optimized manner.

The value may for example be displayed at different locations in the visual field of the pilot, for example in the vicinity of the revision means (finger, cursor) or elsewhere in the cockpit (head-up display, augmented reality type superimposition, 3D rendition, etc.).

The captured values may be rendered (on return from selecting them) in a number of ways. In particular, in one specific embodiment, display is effected with rounding off depending on the speed of the finger (on the tactile interface) and/or the aeronautical unit of the parameter being modified. In fact, the method may notably use rounding of the manipulated variable to determine the value that will be used in the subsequent steps. This rounding may be defined statically as a function of the type of data or via a rounding database for each manipulated variable. The speed of movement of the finger (or cursor) over the tactile interface may advantageously be used to define the roundings to be applied. The position of the finger on the model, between two limits, may advantageously be used to define the roundings to be applied. The position of the finger relative to the centre of the model may advantageously be used to define the roundings. The result (i.e. the numerical value) is then sent on to the next step.

In the step 332, an alphanumeric parameter is determined on the basis of the action previously captured. In one embodiment, a value is determined or calculated and then displayed (possibly in real time or in quasi-real time). Intermediate data processing may be carried out, notably unit conversions. For example, the unit of an alphanumeric value received from the step 331 (for example in aeronautical units) can be converted to correspond to the units used by the digital core of the onboard system (for example into SI units for the FMS). The method may equally effect a bounding of linked values (for example the minimum and maximum altitudes for a window, the action on one possibly influencing the other indirectly) or a bounding by limit values (for example where an altitude ceiling is concerned).

A rules database may advantageously be provided for the values (bounding, etc.). An optional variant of the invention may advantageously employ an "autorange" mode when the pointing device reaches the boundary of the screen: if during the definition of a distance the movement of the finger is limited by the edge of the screen, then the "range" may be modified automatically, for example with repositioning of the cursor or a concomitant change in the "range" and the "slew" of the point as revised at the finger on the tactile interface. The "range" may advantageously remain unchanged but the numerical value will be displayed in the alphanumeric box (the "range" will be modified only for the display of the result). In one embodiment, the CDS screen itself is "interactive". For example, the choice of the modes of interaction and the "range" is made by tactile entry operating on the arcs of the rose or the circles of the plane mode (this configuration advantageously avoiding the current rotators).

In the step 340, the method shows the result of the revision—in real time or quasi-real time—for example as a function of the alphanumeric values as determined in the step 332.

In an advantageous but optional embodiment, in the step 351, the validity of the model may be tested. The method may for example determine the "flyability" of the result and show the latter with an associated symbology (e.g. overlap of flight paths, non-flyable offset, non-sustainable altitude constraint, etc.).

Where necessary, in the step 352, the method modifies the revision model as a function, for example, of (a) the required accuracy (for example at the end of revision a "coarse" model may be integrated in order to initialize the revision or a "fine" or "precise" model in order to adjust it; (b) other modified parameters. For example, a time parameter modification may be an absolute time (UTC, materialized by a clock or a HHMMSS representation), or a relative time (chronometer representation), or a delay relative to the current time (hourglass representation). When the revision is confirmed (respectively cancelled), the FMS system is updated, the model is deleted, and the method returns to the step of detecting or determining objects (or display areas) manipulated on the screen.

In steps 353 and 354, the method in accordance with the invention can recover information regarding validation or deletion of the revision (for example after clicking on "OK" or "KO"). If clicking on KO is chosen, the method reiterates the action capture steps. If clicking on OK is chosen, the method validates the revision at the level of the digital core of the SMS and deletes the symbologies that were used for the revision, together with the validation/deletion menus, after which the method awaits a new revision.

Advantageous but optional embodiments are described hereinafter.

Optionally, the values modified by the finger on the tactile interface change colour according to the results of the calculations by the FMS. For example, a white value may indicate that the calculation result is nominal (i.e. there is no risk to the aircraft), an orange or amber value indicates that the calculation produces a value approaching acceptable limit values, and a red value indicates an unacceptable result (that will be rejected or automatically adjusted to the closest acceptable value).

FIG. 4 shows an example of classification 400 of revisions and different examples of craft parameters (421 to 429). The revisions are divided into three basic main types or families or categories or classes: 1) the family of revisions not necessitating alphanumeric input (for example movement of a point); 2) the family of alphanumeric mono-entry revisions (concerning only one parameter, for example entering an ATO (along track offset) that enables a point to be defined in terms of a distance relative to another; the parameter is therefore the distance, signed (+/−)) and 3) the family of alphanumeric multi-entry revisions (concerning a plurality of parameters, for example the entry of a holding pattern).

For each of the categories of revisions, the method is based on or refers to a library of predefined "craft" models. These models are also referred to as "unitary models". In aeronautics in general, and for sortie management systems (FMS, EFB, TAXI, etc.), the various models are of type a) Distance and length b) Circular offset c) Linear distance d) Arrival at an element e) Angle output to an element f) Altitude g) Speed h) Time i) Lat/Long j) Mass k) Centring l) "integer number" type m) "discrete listing in a menu" type.

The current revisions of the standardized (notably AEEC ARINC 702) FMS, flying at present in most airliners and business aircraft comprise revisions: 1) creating or modifying FMS elements of point or leg type; 2) defining the constraints associated with an element (point/leg); 3) defining constraints over a portion of the flight path (defining waiting or alignment/return procedures, defining tactical procedures, of flight path shortening type, of type defining the meteorological environment, defining the aircraft status, defining the position of the aircraft, of administration of the various flight plans of the aircraft). Other revisions are possible and may be manipulated by the method in accordance with the invention.

FIG. 4 shows nine parameters typical of the FMS craft: character string 421, altitude 422, speed 423, time 424, distance/length 425, angle 426, status/type 427, coordinates 428, number 429. This list of parameters is given by way of illustration and is not limiting on the invention: the method in accordance with the invention may be applied to any list of predefined parameters (e.g. a parameter may be divided into a plurality of subparameters, which can be grouped differently, etc.).

A field of use of a parameter (or of a plurality of parameters) of the unitary or elementary model may advantageously be determined, so as to be able to select/modify the parameter only in accordance with authorized values, for example a) by applying a graphic mask (for example between the minimum and maximum values of the parameter) to the model, the associated advantage residing notably in the generic nature of the model displayed, which can always be the complete unitary model, or b) by graphically restricting the model itself (for example to the minimum and maximum values, the associated advantage then residing in rapid readability of the bounds).

FIGS. 5 to 11 show different examples of symbologies in accordance with the invention.

The various symbols shown in FIGS. 5 to 11 may interchangeably be used or implemented by means of a tactile interface ("finger") or via the manipulation of pointing devices (e.g. mouse cursor, trackball, rotators, ToF Time of Flight camera device, depth sensor, movement sensor, eye tracking, head tracking, EEG brainwave commands, gestural commands e.g. by means of accelerometers and/or gyros, haptic sensors, etc.). In other words, a symbology in accordance with the invention may be produced in a "cursor" version and/or in a "tactile" version, i.e. using only the cursor or only a tactile interface, or a combination of the two types of interface.

Figure 5:
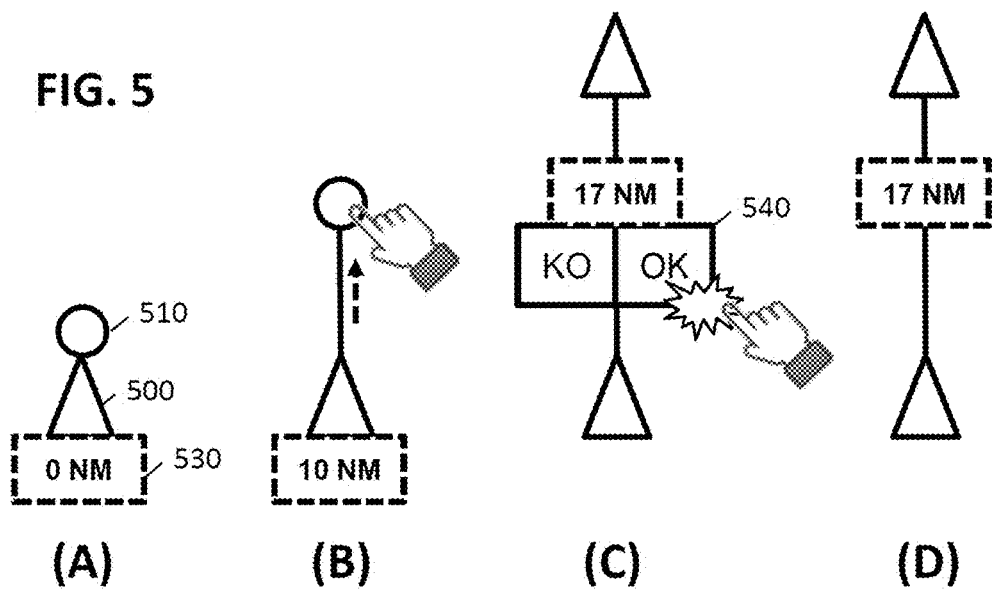
FIGS. 5 to 11 show various examples of symbologies in accordance with the invention.

FIG. 5 shows a symbology for entry of a distance. Initializing the interaction consists in positioning a graphic symbol (represented by a triangle 500 in the FIG. 5 example) on the revised element or object. A second graphic symbol corresponding to a "modification point" enables said revision to be effected. The second graphic symbol is represented by a triangle 510 in the FIG. 5 example. The numerical value of the distance is displayed, for example in a "distance box" 530, for example below the "modification point" 510. An initial value equal to zero has been chosen by default in the example, but it is to be understood that a different default value may be used, for example as a function of the context of the revision.

The step (A) corresponds to the initial situation. In the cursor version, the cursor may be positioned automatically on the "start point". In the "finger" version, in accordance with one embodiment, the finger is placed on the "start point" to commence the interaction. In the step (B), the second graphic symbol 510 or "modification point" 510 is moved either by moving the cursor or by moving the finger over the tactile interface. In accordance with one embodiment, the "distance box" 530 is also moved, in order to remain within the field of view. In accordance with an alternative embodiment, the "distance box" 530 remains at a fixed position. In one embodiment, the alphanumeric value (i.e. the distance) is displayed in real time in the "distance box" 530. For its part, the validation may be effected in various ways. Without this limiting the invention, the validation may be effected: by classic drag and drop, by clicking with the cursor where appropriate, raising the finger from the tactile interface, by pressure (e.g. double "tap"), etc. Hereinafter, either the revision is taken into account immediately or a "confirmation box" 540 appears ("OK" to confirm the revision or "KO" to cancel it). If the revision is applied immediately, the pilot may be given the possibility of cancelling the latest actions by the presentation of an "UNDO" button (each click on this button returning the system to its prior state). In the cursor version, the cursor may optionally be placed on "OK" by default. According to an alternative, the cursor may be left in place. Confirmation by clicking/selection on "OK" terminates the revision. The dialogue boxes disappear.

In accordance with particular embodiments, if in the confirmation step the finger or the pointing device is again placed on the "modification point", the latter may revert to the status of the second graphic symbol in order to enable the modification to continue. The "validation box" then disappears. This distance symbology as described may be used on a flat display (for example the Lat/Long ND) or by a vertical display (for example the VD (vertical display) of altitude/distance). Moreover, a unit may be changed by simply clicking on the unit in question, in the "altitude box", or selecting it with the finger. For example, it is possible to change from NM (Nautical Miles) to FT (Feet) and then KM (kilometers).

Figure 6:
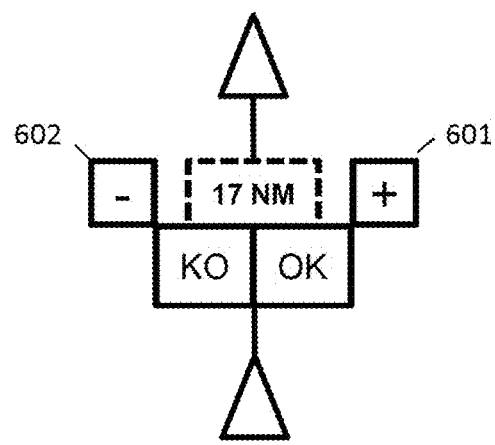

FIG. 6 shows an example of options for value entry. In fact, in order to refine the values entered, one embodiment of the method in accordance with the invention optionally includes one or more additional steps. Following raising the finger, refining the value is proposed using the buttons "+" 601 and "−" 602 situated on either side of the displayed value (with or without overlap, with or without display superposition). These "+" 601 and "−" 602 buttons may for example be implemented by dividing the display area for the revised number into two parts: clicking on the left-hand area decrements the revised value while clicking on the right-hand area increments it. This graphic option avoids having to define new graphical elements.

Figure 7:
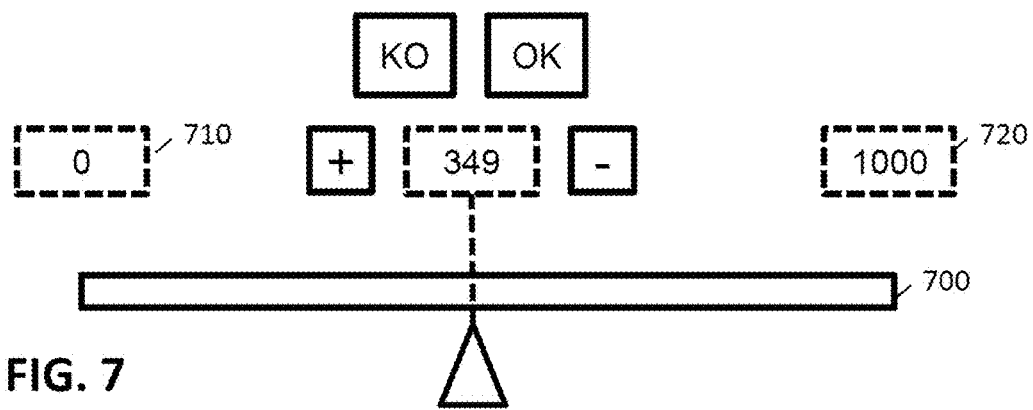

FIG. 7 shows an example of symbology for processing values that are in a defined range (minimum value 710 and maximum value 720). The range of values is represented in the form of a horizontal or vertical bar 700. The principle of interaction is similar to that of FIG. 5.

In one embodiment, the revisions may be implicit, for example as a function of the movement to slide the finger between two elements, from the start point toward the designation point.

In a first case, the departure point is a point on the flight plan. An element of the flight plan is selected by the pilot after which this element is "slid" or moved as far as another element of the flight plan or the MAP (a waypoint, a beacon, etc.). An FPLN "shorten" revision between these two points may be produced automatically by directly connecting the two points of the flight plan and deleting the intermediate elements. Likewise, the discontinuity between the start point and the designation point may be automatically deleted (Clear_Disco). A new flight point may be inserted (for example if the designation point is a point on the MAP). Alternatively, a contextual revision menu may be opened between the two elements in order to extend the possibilities (by way of nonlimiting example: Shorten, Insert Next Waypoint, calculate the Distance/Bearing pair between the elements, calculate the duration/fuel for flying to the point and where applicable the Fuel at the destination if passing this point ("what if"). In one alternative, the finger is raised without having designated any element. The Insert_Nxt_Wpt revision is then carried out by creating an OMD positioned at the location where the pilot's finger was raised. In an alternative the "waypoint" is moved from the starting point. In an alternative, it may be proposed to effect a DIR TO RADIAL OUT and the radial formed by the starting point and the designation point displayed. In a variant, a contextual menu may be opened proposing the revisions for inserting the next waypoint (and also other parameters such as "move waypoint" and offset, DIR TO RADIAL OUT, etc.).

In a second case, the start point is an element of the MAP. An element of the MAP (waypoint, navaid, etc. or a position) is then selected, said element is then caused to slide by the finger or the cursor as far as an element of the flight plan, after which the finger is raised. The distance and the bearing are displayed during this. On lifting the finger off the tactile interface the flight plan is modified automatically. The start point is inserted before the designation point. (Where applicable) a discontinuity is inserted before the start point in the resulting flight plan. If the start point does not represent a known element from the MAP (just a position), a point is created in OMD. In an alternative, a contextual menu is opened up between the two elements in order to extend the possibilities (for example, if the start point is a beacon, the proposal is to "tune" the beacon when arriving at that point). The designation point is replaced by the start point. In an alternative, the start point is moved from a point of the flight plan. It is then proposed to execute a command or revision "DIR TO RADIAL IN" by displaying the radial formed by the start point and the designation point.

In one embodiment, the screen is a "multi-touch" screen, that is to say one adapted to receive multiple simultaneous commands. Tactile interactions via a plurality of fingers should enable particular interactions. For example, the use of several fingers may correspond to the rapid transit of the values while interaction with one finger may correspond to a reduced scrolling speed (but on the other hand would enable more precise adjustments).

Generally speaking, the use of graphic effects can make it possible to enrich the interaction and in particular to show the temporary aspect of a revision. For example, the link between a revised element and the finger or cursor may be represented in the form of dashes. Graphic effects (e.g. blinking, animation, colour codes, artefacts, etc.) may make it possible to enrich the interaction.

Figure 8:
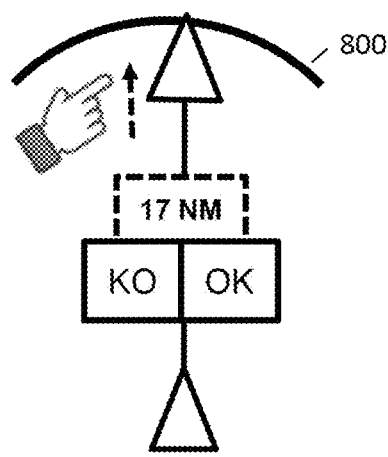

FIG. 8 shows a symbology for the Circular separation type of model. In the example shown in FIG. 8, only part of the arc 800 is represented. In the context of the revision, some or all of the arc 800 may be represented (if the entire arc is not represented, this means that the entire circle is displayed around the start element). The initialization of the interaction consists in positioning, on the revised element (a graphic symbol in the form of a triangle in the example), a "modification arc" of the revision (the circle). The numerical value of the distance is also displayed in a box 810, for example below the "modification arc". The value 1 NM is indicated by default, but a different default value may be used as a function of the context of the revision. In the "cursor" version, the cursor may be positioned automatically on the "modification arc" 800, above the revised point, for example. In the "finger" version, the finger may be positioned on the "modification arc" 800 to commence the interaction. In the next step, the cursor is moved either by movement of the cursor or by movement of the finger. The "modification arc" 800 "expands" with the cursor/finger, as well as the "distance box" 810 in order to remain within the field of vision. The alphanumeric value (i.e. the distance) is displayed in real time in the "distance box" 810. The subsequent (e.g. validation) steps unfold in a similar manner to the corresponding steps for the symbols described above.

A symbology for the "Linear distance" type of model (not represented in the figures) may be the same as that used for the Circular separation, except that the "distance box" can display the distance along the flight path relative to the revised element. An algorithm then calculates the intersection between the circular arc and the flight path, as close as possible to the revised point, and determines the length of the flight path between the revised point and the intersection in question. The advantage associated with this embodiment resides in the fact that, for some revisions, the movement of a cursor can follow the flight path if the revision is so-called ATO. In this case, the movement of the finger in the same context on the screen will cause a movement of the flight path under the finger (realignment) or the display of an arc if the finger is no longer on the flight path concerned. The numerical value could be the distance between the finger and the start point or the distance along the flight path. In other words, the aircraft symbol is selected and then caused to slide toward the rear of the A/C (in optional manner) and then toward one of the sides of the screen, thereby creating an offset and a display of the flight path of the offset in real time or quasi-real time.

Figure 9:
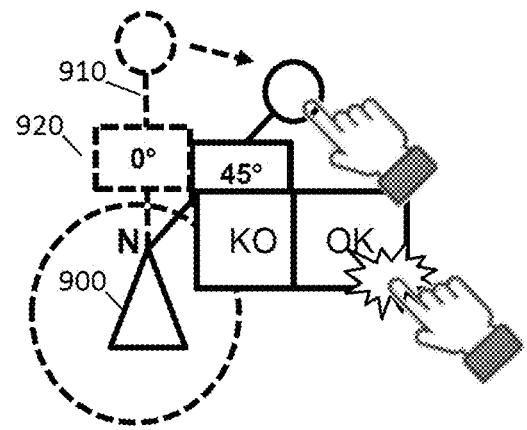

FIG. 9 shows an example of symbology linked to the definition of angles (using the cursor and/or the finger). In a similar manner, the initialization of the interaction consists in positioning on the revised element (a triangle 900 in this example) a "modification half-segment" 910 of the revision, associated with an angular rose 920 (the circle oriented toward the north for example). The numerical value of the angle is also displayed in an "angle box" 930, below the "modification half-segment" 910. The numerical value equal to zero is indicated by default by way of example, but a different default value may be used as a function of the context of the revision. In the "cursor" version, the cursor may be positioned automatically on the "modification half-segment", above the revised point, for example. In the "finger" version, the finger may be positioned on the "modification half-segment" to commence the interaction. In the next step, the cursor is moved, either by moving the cursor or by moving the finger. The "modification half-segment" moves with the cursor/finger, likewise the "angle box" in order to remain within the field of vision. The alphanumeric value (the angle relative to the reference, here north) is displayed in real time in the "angle box". The subsequent (e.g. validation) steps unfold in a similar manner to the corresponding steps for the symbols described above. This symbology may notably be used for angular modifications "toward an element" or for angular modifications "away from an element". In order for the method to be able to determine whether this is an action "toward" or "away from" an element, the method may initially position the arrow toward a default value (for example "toward the element"). To change direction, a click on the arrow can make it possible to go to the "away from the element" value. In one embodiment, if the blue revision circle is brought back toward the revision point, and crosses it, the direction of the arrow may be reversed. In a variant embodiment, in order to discriminate the two directions visually, an "IN" or "OUT" character may be added in the "angle box" or an arrow on the line of movement (not shown in the figures). This symbology may be used on a flat display (e.g.: Lat/Long ND) or vertical display (e.g. altitude/distance CD). In the case of the VD display, the symbology may represent the slope (Altitude delta relative to Distance delta). The speed of movement of the cursor or the finger may advantageously be used by the system to associate a finer or less fine level of granularity of the manipulated variable. Thus a rapid movement may be associated with rounded and integer angle increments 2° by 2° or 5° by 5°. A slower movement may be associated with roundings and integers of 1°, even roundings to ½. On a VD type screen on which the angles are finer, for example for descent aerodynamic slopes, between 1 and 4°, the movements will be interpreted in tenths of a degree. In accordance with one optional embodiment, the numerical values entered may be refined by means of "+" and "−" buttons as described above.

Figure 10:
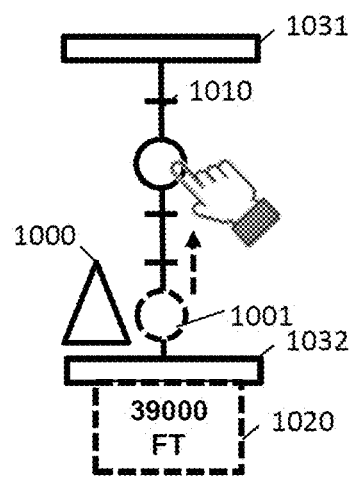

FIG. 10 shows an example of symbology for the altitude model (e.g. definition of altitudes using the cursor or finger). The initialization of the interaction consists in placing on—or alongside—the revised element 1001 (corresponding to a triangle 1000 representing the aircraft), a "Modification scale" of the revision 1010. The numerical value of the altitude and its unit is displayed in an "altitude box" 1020, for example under the "Modification scale". A graphic symbol (here the circle 1001) is materialized on the scale, in the middle. Its movement corresponds to the evolution of the altitude, one way or the other (according to whether it is moved above or below its mid-point). In a subsequent step the cursor is moved either by moving the cursor by means of a pointing device or by moving the finger over the tactile interface. The graphic symbol 1001 moves following the selection over the "Modification scale". The altitude alphanumeric value is calculated and displayed in real time in the "altitude box" 1020.

A default initialization value may be fixed at 5000 feet, but different default values may be used, for example as a function of the context of the revision. In a "cursor" embodiment, the cursor may be positioned automatically on the "Modification scale", for example in the middle. In a "finger" embodiment, the finger may be positioned on the "Modification scale" in order to commence the interaction. The symbology associated with the attitude model has the advantage of occupying little space on the display screen, compared to a complete scale of altitude (representing a scale of 40000 ft, with a selection to within 100 ft would be difficult on a simple altitude scale). The subsequent (e.g. validation) steps unfold in a similar manner to the corresponding steps for the symbols described above.

Moreover, the changes of units (e.g. feet, meters, flight level, etc.) may also be effected directly by simply clicking to select with the finger (for example in the "altitude box"). The altitude values may be bound, for example by a ceiling value 1031 or a floor value 1032. These values may be determined by the system (e.g. may depend on the revision). If a value hits the stop, the "altitude box" may fix the value at the bound and a modification of symbology may be effected to indicate the reason for the bounding. The movement button (circle) can also change to indicate reaching a bound.

In a variant embodiment (not shown in the figures), reaching a bound (maximum altitude ceiling) may be materialized by a specific display of the altitude box 1020 (e.g. red colour, blinking, etc.). In a variant embodiment, the values of the bounds may advantageously be displayed at the bounds of the scale.

Figure 11:
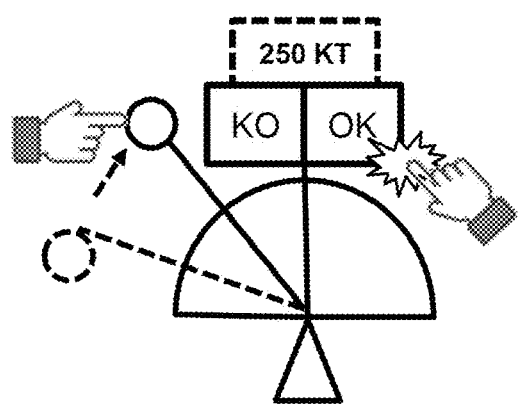

FIG. 11 shows an example of symbology linked to the display of speeds (cursor or finger). In a variant embodiment the display is of the analogue meter type: the action is effected directly on the pointer of the meter, with a numerical value displayed as a check.

Various other symbologies that are not shown are possible, notably the symbologies adopted for a) the time type of model (action on the hands of a clock, chronometer, hourglass, etc.), b) the lat/long type of model (e.g. display of a cross and display by transparency of a latitude and longitude grid enabling better location of the aircraft), c) the weight type of model (e.g. involving the unladen weight, the freight weight, the weight of passengers, the weight of fuel; various options are possible here; a synthetic or total symbology or a plurality of separate symbologies may be used), d) the centring model (e.g. aircraft seen in profile with one or more graphic symbols for modifying the centring of the aircraft, as well as appropriate options for more precise adjustments), e) the "whole numbers" type of model and f) the "discrete listing in a menu" type of model (e.g. symbology in correspondence with the modelled values; for the position of slats and flaps, for example, the representation could use a symbol of airfoil shape).

Generally speaking, the list of models may be stored in a database, for example a predefined database, configured from the ground or onboard.

After exiting a current revision, whatever the nature of that revision, the method in accordance with the invention may use a number of techniques. Clicking (or tactile selection) on another element cancels the current revision and opens a dialogue box on the new element selected to choose a revision. Clicking or selecting on the screen in an area outside the area corresponding to the revised element can cancel the current revision. The area corresponding to the revised element may correspond to the graphic area for display of modification graphic elements (half-segment, scale, rose, etc.) with a configurable margin (for example). In a variant embodiment, when a revision is selected, a CANCEL or DELETE or KO or RETURN type button may be permanently displayed, instead of the KO and OK buttons, until the KO and OK buttons appear (i.e. when the modification is finished).

Figure 12:
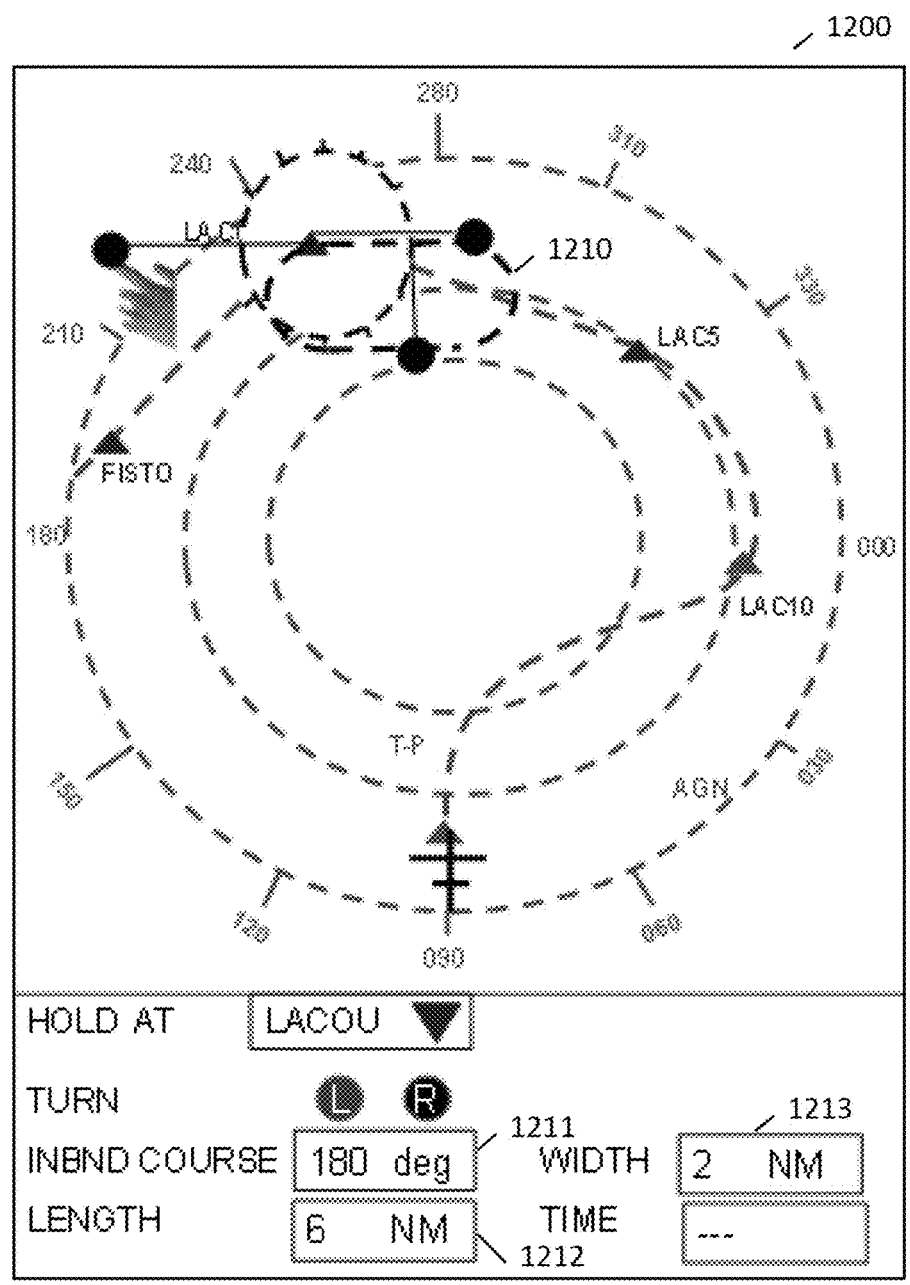
FIG. 12 shows the superposition of different symbologies on a display screen of the FMS.

FIG. 12 shows the superposition of different symbologies on a display screen 1200 of the FMS.

In a situation taken by way of example, the crew wishes to enter a holding pattern 1210, for example at an in-flight refuelling rendezvous, or in response to an instruction from air traffic control sufficiently free to be carried out by the pilot as understood by the pilot. The pilot then seeks to optimize the manoeuvre. In practice, numerous alphanumeric inputs are necessary, to determine the geometry of a holding pattern. A holding pattern is characterized by four parameters: 1) the axis (in degrees), 2) the direction (left or right), either "L" or "R", 3) the length of the straight line segment (called the inbound leg, typically in NM (nautical miles), or in time (in minutes or in seconds)), 4) distance from the holding pattern (in NM, or in turn angle in degrees). Some parameters may be dependent in some FMS (for example the distance corresponds to ½ turn and depends on the roll, which may be a function of the speed and altitude in some implementations).

FIG. 12 shows such a holding pattern, entered by the pilot in the screen cartridge with its various characteristics: the angle of arrival 1211 at the holding pattern hook-up point (LACOU) is 180°, the length of the straight branches 1212 (referred to as Inbound and Outbound) is 6 NM and the width 1213 is 2 NM. A number of symbologies may be superposed to enter this holding pattern: a) a symbology of the "distance length" model on the straight line segment of arrival at the holding pattern hook-up point, enabling manual modification of the length; optionally, a duration (hourglass) type symbology on the straight line segment of arrival at the holding pattern hook-up point, enabling manual modification of the travel time; b) a symbology of the "angle" model at the holding pattern hook-up point; optionally, c) a symbology of the linear distance type between the two straight line segments of the holding pattern; optionally, d) a symbology of numerical "meter" type enabling choice of the number of circuits of the holding pattern; optionally, e), a "clock" type symbology enabling entry of an exit time; optionally, f) a symbology of "fuel" type for adjusting the fuel requirement at exit (operates on the number of circuits). In accordance with other examples, it is possible to superpose an angular symbology, a linear distance symbology (length of the straight line segment) and a distance type of symbology for the width of the holding pattern, etc.).

FIG. 12 therefore shows examples of entry tasks that are typical in the context of piloting an aircraft. The method in accordance with the invention considerably simplifies the workload of the pilot. Pilots can at a glance view all of the options open to them, the impacts of those various options, unambiguously and with relative safety in respect of the entry of the information.

Figure 13:
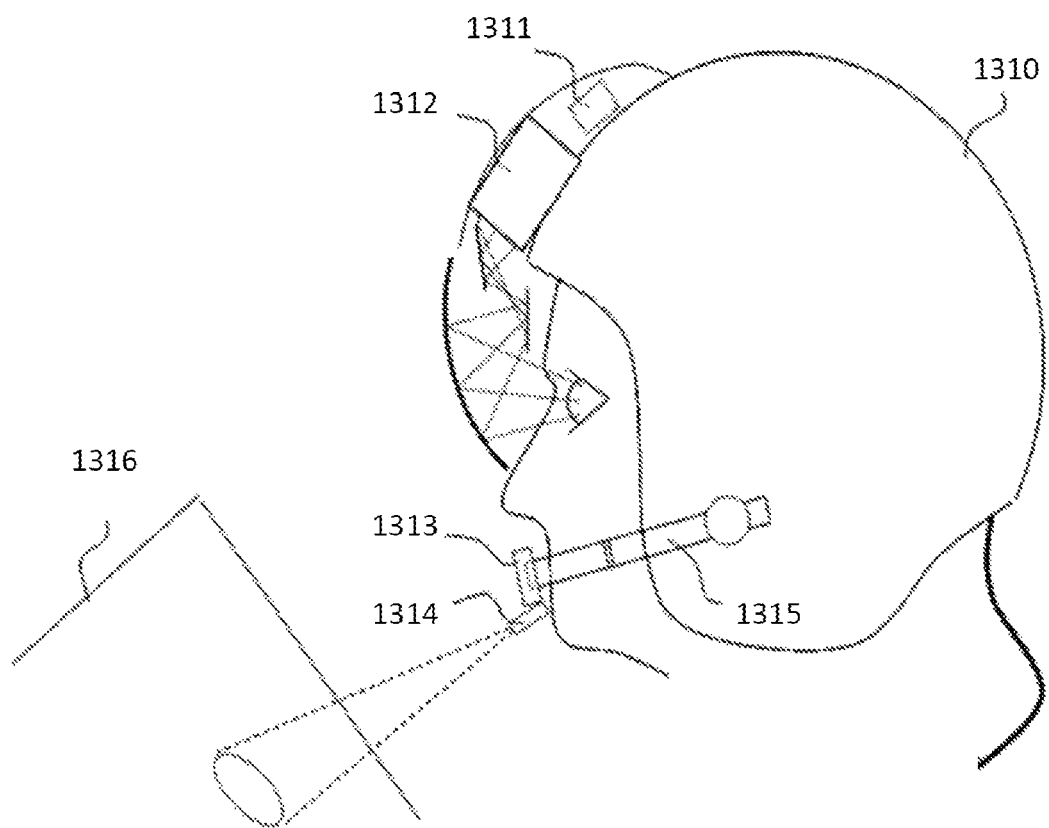
FIG. 13 shows various aspects relating to the human-machine interfaces (HMI) for implementing the method in accordance with the invention.

FIG. 13 shows various aspects relating to the human-machine interfaces HMI that may be used to implement the method in accordance with the invention. In addition to—or instead of—the screens of the FMS and/or EFB onboard computer, additional HMI means may be used. Generally speaking, FMS avionic systems (which are systems certified by the air regulator and that may have some limitations in terms of display and/or ergonomics) may advantageously be complemented by non-avionic means, in particular advanced HMI. Among these advanced HMI, certain embodiments of the invention may be implemented by augmented reality AR means (e.g. projectors, goggles, etc.) and/or in virtual reality VR (e.g. visor, video helmet, etc.). Some embodiments may be AR/VR combinations or hybrids or in other words there may be combined EVS (Enhanced Vision System) and/or SVS (Synthetic Vision System) means. For example projection means can project information onto the windshield and/or interior elements of the cockpit of the aircraft.

In particular, said human-machine interfaces may use virtual and/or augmented reality helmets. FIG. 13 shows an opaque virtual reality helmet 1310 (or a semi-transparent augmented reality helmet or a helmet of configurable transparency) worn by the pilot. The individual display helmet 1310 may be a virtual reality (VR) helmet or an augmented reality (AR) helmet or a head-up display helmet, etc. The helmet may therefore be a head-mounted display, a wearable computer, glasses or a video helmet. The helmet may include calculation and communication means 1311, projection means 1312, audio acquisition means 1313 and video projection and/or video acquisition means 1314 (for example used for scraping analog data accessible in the cockpit or the pilot cabin of the aircraft). As a result, the pilot can—for example by means of voice commands—configure the display of the flight plan in three dimensions (3D). The information displayed in the helmet 1310 may be entirely virtual (displayed in the individual helmet), entirely real (for example projected onto plane surfaces available in the real environment of the cockpit) or a combination of the two (in part a virtual display superposed on or merged with reality and in part a real display via projectors). The display may also be characterized by the application of predefined display rules and location rules. For example, the human-machine interfaces (or the information) may be "distributed" (segmented into separate portions, possibly partly redundant, then distributed) between the various virtual screens (e.g. 610) or real screens (e.g. FMS, TAXI).

The various steps of the method may be implemented in whole or in part on the FMS and/or on one or more EFB. In one particular embodiment, all of the information is displayed on the screens of the FMS alone. In another embodiment, the information associated with the steps of the method is displayed on the onboard EFB alone. Finally, in another embodiment, the screens of the FMS and an EFB may be used conjointly, for example by "distributing" the information over the various screens of the various devices. A spatial distribution of the information effected in an appropriate manner may help to reduce the cognitive load on the pilot and therefore improve decisionmaking and make the flight safer.

Concerning the system aspects, some embodiments are advantageous (for example in terms of ergonomics and with regard to the concrete possibilities of implementation in the cockpits of existing aircraft). The various steps of the method in accordance with the invention may notably be implemented in the human-machine interface HMI of the FMS (which interacts on the one hand with the core of the FMS—FPLN, TRAJ, PRED—and on the other hand with the CDS display screen). For their part, the models may be stored in the CDS or the FMS and/or configurable via a database. The various steps of the method in accordance with the invention may equally be carried out in equipment such as the EFB, ANF, TP ground stations or tablet.

The present invention may be implemented on the basis of hardware and/or software elements. It may be available as a computer program product on a computer-readable medium. The medium may be electronic, magnetic, optical or electromagnetic. The data processing means or resources may be distributed (cloud computing).

Various other aspects of the invention are described hereinafter.

In one embodiment, for example as a function of certain actions of the pilot, the method determines a target element on the screen. The method then determines "substitution" elementary interaction models. By "substitution" is meant taking account of the interaction context. For example, a substitution interaction model could be determined (and then used) as a function of a selected revision. If the predetermined revision action includes alphanumeric entry, the method in accordance with the invention may generate a display including a graphic entry action, said display corresponding to said action and being determined from a predefined list of alphanumeric/graphic substitution models on the discrete elementary commands in respect of distance, altitude, speed, time, weight and centring.

In one embodiment, when an action is determined on a flight plan element or a portion of the flight path—or any other element displayed on the screen—the method can determine a "graphic mask" to be applied to the chosen element, from a set of predetermined masks, and corresponding to the data to be manipulated. The management of tracings or graphic abstraction levels is advantageous in that it enables great flexibility of use. In a subsequent step, the method in accordance with the invention may so to speak transform the action of the pilot on the mask into alphanumeric data to deduce therefrom the revision to be applied in the core of the FMS, on the flight plan, flight path, predictions, guidance and other functions of the FMS. In one embodiment, as the finger is applied repetitively—or for a long time on the tactile screen (for faster incrementing or decrementing, for example) or a functionally equivalent pointing device on a non-tactile screen—the data captured and interpreted is communicated to the digital "core" of the FMS to calculate and display the effect of the captured action on the elements of the FPLN (flight plan, flight path, etc.).

The invention claimed is:

1. A method for piloting an aircraft with a graphical interaction computer, the method comprising:
   receiving an indication of an object selected on a display screen of the aircraft;
   determining one or more flight plan revisions of the aircraft associated with the selected object and displaying one or more of said flight plan revisions;
   receiving an indication of a selected revision of the one or more displayed revisions;
   determining a revision type associated with the selected revision;
   displaying a tactile interface data entry graphic symbol as a function of the determined revision type, said data entry graphic symbol being selected from a plurality of data entry graphic symbols;
   detecting a movement of a finger on or over the display screen to measure a cognitive load of a pilot of the aircraft; and
   modifying the displayed entry graphic symbol as a function of the measurement of the cognitive load of the pilot of the aircraft.

2. The method of claim 1, further comprising receiving data after displaying the data entry graphic symbol.

3. The method of claim 2, further comprising modifying the received data.

4. The method of claim 2, further comprising validating the selected revision.

5. The method of claim 2, further comprising modifying the selected revision.

6. The method of claim 1, wherein displaying the data entry graphic symbol comprises distributing said display spatially and/or temporally.

7. The method of claim 1, further comprising receiving or determining a parameter associated with the selected object.

8. The method of claim 7, wherein determining one or more flight plan revisions of the aircraft is a function of said parameter associated with the selected object.

9. The method of claim 7, wherein determining and/or displaying the tactile interface data entry graphic symbol is a function of said parameter associated with the selected object.

10. The method of claim 1, wherein determining and/or displaying the tactile interface data entry graphic symbol is a function of one or more parameters comprising: the amount of data to enter, the type of revision to be made, the entry unit type, the display range, the representation type, and one or more predefined criteria.

11. The method of claim 1, wherein modifying the displayed entry graphic symbol is further a function of a measurement of a flight context of the aircraft.

12. The method of claim 11, wherein the measurement of the flight context of the aircraft includes a measurement of a turbulence of the aircraft.

13. A system for piloting an aircraft, the system comprising:
   a graphical interaction computer configured to:
      receive an indication of an object selected on a display screen;
      determine one or more flight plan revisions of the aircraft associated with the selected object and displaying one or more of said flight plan revisions;
      receive an indication of a selected revision of the one or more displayed revisions;
      determine a revision type associated with the selected revision;
      display a tactile interface data entry graphic symbol as a function of the determined revision type, said data entry graphic symbol being selected from a plurality of data entry graphic symbols;
      detect a movement of a finger on or over the display screen to measure a cognitive load of a pilot of the aircraft; and
      modify the displayed entry graphic symbol as a function of the measurement of the cognitive load of the pilot of the aircraft.

14. The system of claim 13, wherein the graphical interaction computer comprises at least one of a PFD principal flight display, an ND/VD navigation display, and an MFD multifunction display.

15. The system of claim 13, wherein the graphical interaction computer comprises at least one of Flight Management System type avionic means, Electronic Flight Bag type non-avionic means, augmented, and virtual reality means.

16. The system of claim 13, wherein the graphical interaction computer comprises only tactile type interface means.

* * * * *